United States Patent [19]

Dierke et al.

[11] Patent Number: 4,830,091
[45] Date of Patent: May 16, 1989

[54] METHOD OF REMOVING HEAT FROM A VERTICAL STEAM REFORMER CONNECTING PIPE

[75] Inventors: Ruediger Dierke, Lingen Ems; Gottfried Schlichthaerle, Neustadt; Peter Schuchart, Frankenthal; Armin Schweitzer, Ludwigshafen, all of Fed. Rep. of Germany

[73] Assignee: BASF Aktiengesellschaft, Ludwigshafen, Fed. Rep. of Germany

[21] Appl. No.: 196,876

[22] Filed: May 19, 1988

Related U.S. Application Data

[60] Continuation of Ser. No. 915,665, Oct. 6, 1986, abandoned, which is a division of Ser. No. 727,132, Apr. 25, 1985, abandoned.

[30] Foreign Application Priority Data

Apr. 28, 1984 [DE] Fed. Rep. of Germany ....... 3415916

[51] Int. Cl.$^4$ .......................... B01J 8/06; F16L 13/02
[52] U.S. Cl. ......................................... 165/1; 165/47; 165/134.1; 165/921; 422/197; 422/203; 196/133; 48/196 A; 48/214 A
[58] Field of Search ...... 165/135, 134.1, 921, 165/47, 1; 422/203, 205, 197, 7; 196/133; 48/214 A, 214 R, 196 A, 196 R; 252/373

[56] References Cited

U.S. PATENT DOCUMENTS

| | | | |
|---|---|---|---|
| 2,345,423 | 3/1944 | Pfannmuller | 422/197 |
| 3,334,971 | 8/1967 | James et al. | 48/214 A |
| 3,531,263 | 9/1970 | Sederquist | 48/196 A |
| 3,607,130 | 9/1971 | Worley | 48/196 A |
| 3,645,701 | 2/1972 | Banchik et al. | 48/196 A |
| 3,656,913 | 4/1972 | Blaha et al. | 48/196 A |
| 3,721,531 | 3/1973 | Tuncer | 48/196 A |
| 3,899,420 | 8/1975 | Nozawa et al. | 196/133 |
| 4,034,803 | 7/1977 | Reed et al. | 165/135 |
| 4,113,441 | 9/1978 | Suzuki et al. | 48/196 A |
| 4,203,950 | 5/1980 | Sederquist | 422/197 |
| 4,647,436 | 3/1987 | Herbert et al. | 165/921 |

OTHER PUBLICATIONS

Hill, William H., "Internal Insulation for Pipes Under High Pressure", The Petroleum Engineer, Nov., 1943, pp. 165–166.

Primary Examiner—Albert W. Davis, Jr.
Assistant Examiner—John K. Ford
Attorney, Agent, or Firm—Keil & Weinkauf

[57] ABSTRACT

Heat is removed from, or supplied to, a vertical pipe of any cross-section, whose internal temperature is above or below the ambient temperature and whose wall temperature must neither exceed nor fall below a predetermined temperature range, by a method in which, in order to maintain the predetermined temperature range, the pipe is provided with a coaxial sheath and gas is passed through the gap between the pipe and the sheath. The invention is particularly directed to maintaining a predetermined temperature range at the outer pipe wall of the vertically oriented, double walled pipes which connect the reaction sections with the collectors in a steam reformer.

1 Claim, 2 Drawing Sheets

METHOD OF REMOVING HEAT FROM A VERTICAL STEAM REFORMER CONNECTING PIPE

This application is a continuation of application Ser. No. 915,665, filed Oct. 6, 1986, abandoned, which was a division of Ser. No. 727,132, filed Apr. 25, 1985, now abandoned.

The present invention relates to a method for removing heat from, or supplying heat to, a vertical pipe, of any cross-section, whose internal temperature is above, or below the ambient temperature and whose wall temperature must neither fall below nor exceed a predetermined temperature range.

In steam reformers for the production of synthesis gas, the hot reaction gases at about 750°–900° C. are transported from the reaction section to the collectors in a plurality of parallel and vertical pipes.

In a frequently used embodiment, the pipes used are double-walled pipes, the hot reaction gas being transported in the inner pipes, and the outer pipes being designed as pressure elements. The annular space between the two pipes is filled with heat-insulating materials in order to prevent pronounced heating-up of the outer pipes and a drop in the temperature of the reaction gas. Because of material characteristics, eg. maximum permissible strengths, on the one hand, and possible damage to weld joints (induced by various mechanisms), on the other hand, it is absolutely necessary to maintain the outer pipes in a predetermined temperature range of about 140°–400° C. Such pipes are frequently exposed to changing weather conditions, such as temperature fluctuations, varying wind speeds, sunlight, etc.; furthermore, the heat transport per unit time in the inner pipes changes depending, for example, on whether the throughput through the inner pipes is high, ie. at full capacity, or low, or changes during the start-up or shutdown of the steam reformer. Cooling of the gas present in the annular space between the outer and inner pipes to below, for example, about 140° C. results in the gas being below its dewpoint; the result is corrosion, causing damage to the outer pipes. In the past, the temperature could not always be maintained with sufficient certainty within a range of about 140°–400° C. during changes in the abovementioned weather conditions and in the conditions in the inner pipes. This resulted in, for example, the damage described, preferentially at weld seams, resulting in leakage through the outer pipes, and hence prolonged shutdown of the steam reformer owing to extensive repairs.

Similar problems can also occur in pipes in which chemical reactions take place.

It is an object of the present invention to ensure, by means of simple and economical measures, that a predetermined temperature range is maintained at a pipe wall.

We have found that this object is achieved, in accordance with the invention, if, in order to maintain the predetermined temperature range, the pipe is provided with a coaxial sheath, and the gas is passed through the gap between the pipe and the sheath.

The subclaims relate to further features of the process according to the invention.

Of course, the inventive features stated in the claims are also applicable to an individual pipe of any cross-section, without a sheath consisting of heat-insulating materials and a second pipe, and are not restricted specifically to pipes of a steam reformer or of a reactor.

An example of the invention, possessing the essential inventive features, is shown in the drawing and is described in detail below.

Figure 1:
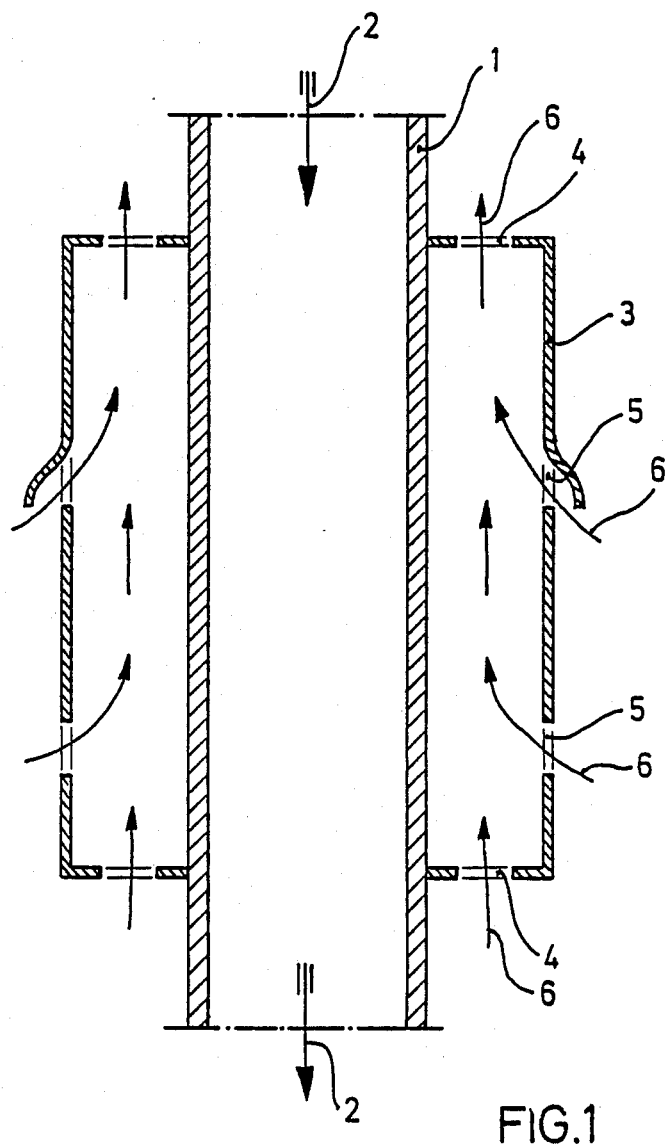
FIG. 1 shows a section through an individual pipe.

In FIG. 1, a pipe 1, through which a fluid 2 flows at elevated temperatures and various flow rates, is provided with a coaxial sheath 3 which is equipped with apertures 4 in the upper and lower ends and also with apertures 5 in the periphery of the sheath. As a result of convection or forced transport by means of a fan, the gas 6 entering or emerging from the apertures flows along the outer jacket of the pipe 1, through the gap between pipe 1 and sheath 3. By opening or closing the apertures, it is possible to alter the rate of flow of the gas stream 6 as a function of the pipe wall temperature so that the latter neither exceeds nor falls below a predetermined temperature range.

Figure 2:
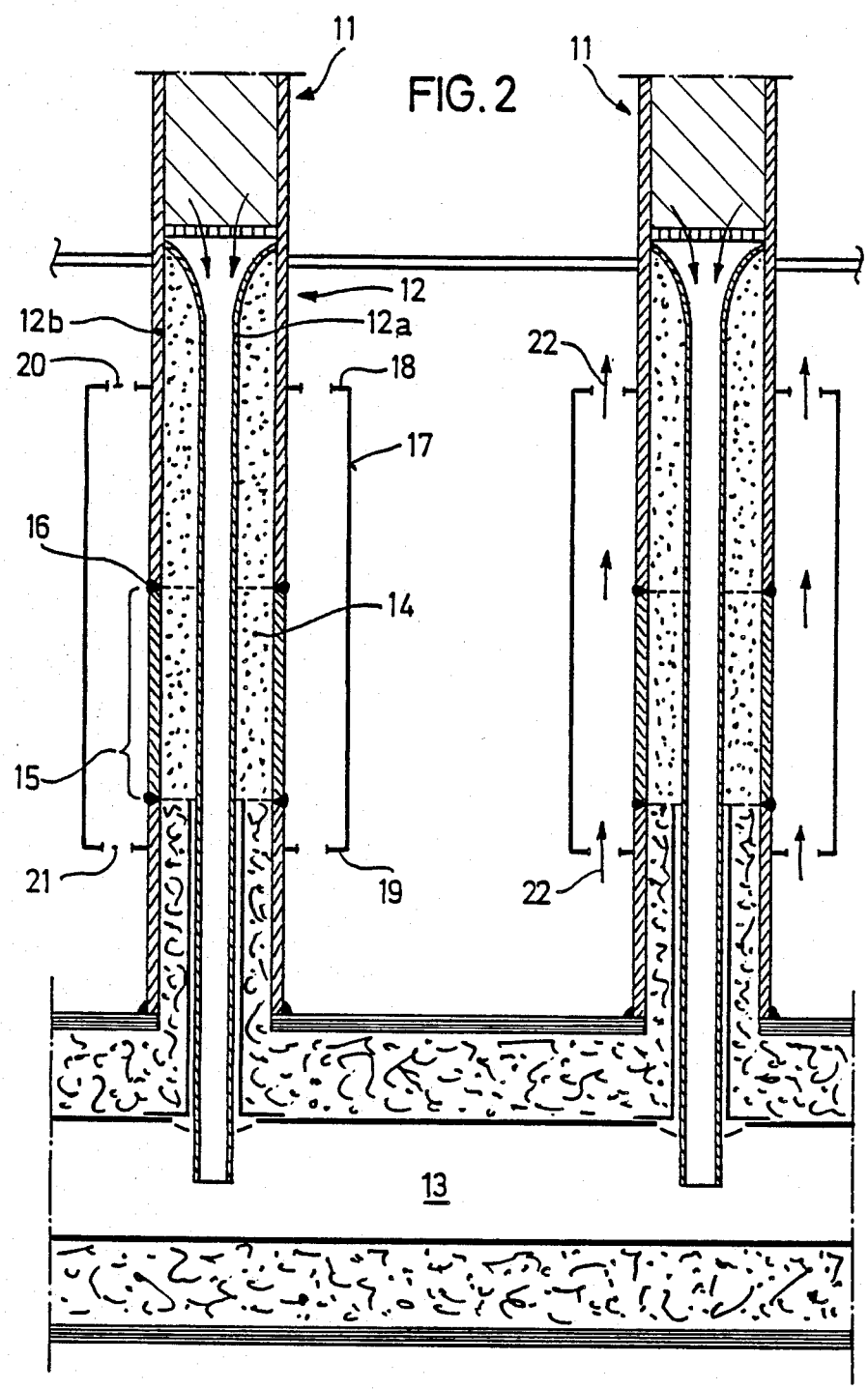
FIG. 2 shows a section through part of a pipe system of a steam reformer, the system consisting of a plurality of individual pipes (greatly simplified).

In the section from a steam reformer shown in simplified form in FIG. 2, a plurality of parallel and vertical reaction pipes 11, designed for reactions taking place under up to about 10–60 bar, lead into a collector 13 via connection pipes 12. The latter, in the form of double-walled pipes, consist of the inner pipes 12a, in which the hot reaction gases at about 750°–900° C. are transported from the reaction pipes to the collector, and the outer pipes 12b. The annular space between the inner and the outer pipes is filled with heat-insulating materials 14. For reasons relating to manufacture, an intermediate pipe section 15 consisting of ferritic steel is welded in at the transition between the outer pipes 12b consisting of austenitic steel and the collector 13 made of ferritic steel; the resulting mixed welding seams 16 suffer corrosion damage when the temperature falls below the dewpoint (>about 140° C.) of the reaction gas present in the annular space between the outer and inner pipes. In order to prevent this, the individual outer pipes 12b are each surrounded by a coaxial sheath 17, which is connected to the outer pipe 12b by an upper end 18 and a lower end 19. These ends contain apertures 20 and 21, which are uniformly distributed in each case and can be opened or closed by means of apparatuses. According to the invention, gas 22, preferably air, is passed through these apertures, through the gap between the outer pipe and the sheath, in order to remove heat from, or supply heat to, the outer pipe. By opening and closing the apertures, and hence increasing or reducing the throughput of gas, the rate of flow of the gas flowing through can be controlled as a function of the pipe wall temperature so that the wall temperature of the outer pipes is kept within the predetermined temperature range of about 140°–400° C.

In a modification of the above, it is possible to provide pipes which are arranged parallel and horizontally one on top of the other, and in which hot gases flow, with a single sheath extending over a plurality of pipes; according to the novel method for the removal or supply of heat, the gas flowing between the sheath and the pipes flows past not just one pipe but a plurality of pipes arranged inside a sheath.

We claim:

1. A method for maintaining a predetermined temperature range at the outer pipe wall of the vertically oriented, double-walled pipes which connect the reaction sections with the collectors in a steam reformer, said connecting pipes being characterized by the presence of both an inner and outer pipe in concentric relationship with an insulated annular space therebetween, said inner pipe serving as the conduit by which hot reaction gases are transported to the collectors from the reaction section with changes in throughput and other conditions causing widely varying temperatures throughout the connecting pipes with structural damage often occurring if a temperature in the range of from about 140°–400° C. is not maintained at the outer pipe wall, said method comprising: surrounding each of said outer pipes with a coaxial sheath attachment equipped with aperture openings at the upper and lower end thereof with a gap space being provided between the pipe and said sheath, permitting a gas stream to enter said lower sheath aperture and to flow by convection through the gap space in contact with the outer pipe wall and to exit the gap space at said upper aperture, wherein the gas flow rate is determined and controlled by the pipe wall temperature.

* * * * *